(12) United States Patent
Sawyer et al.

(10) Patent No.: US 8,700,781 B2
(45) Date of Patent: Apr. 15, 2014

(54) AUTOMATED PROCESSING OF SERVICE REQUESTS USING STRUCTURED MESSAGING PROTOCOLS

(75) Inventors: David B. Sawyer, Leesburg, VA (US); Ronnie D. King, Jr., Perry Hall, MD (US); Gopinath Srinivasan, Laurel, MD (US); Richard S. Bice, Rochester Hills, MI (US); Jon P. Brusseau, Clinton Township, MI (US); Richard L. LaCourse, Laurel, MD (US); Herbert T. Raffaele, Annandale, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1477 days.

(21) Appl. No.: 11/130,162

(22) Filed: May 17, 2005
(Under 37 CFR 1.47)

(65) Prior Publication Data
US 2006/0013367 A1 Jan. 19, 2006

Related U.S. Application Data

(63) Continuation-in-part of application No. 09/879,816, filed on Jun. 12, 2001, now abandoned.

(60) Provisional application No. 60/571,947, filed on May 17, 2004.

(51) Int. Cl.
*G06F 15/16* (2006.01)

(52) U.S. Cl.
USPC .......................... 709/227; 709/228; 709/229

(58) Field of Classification Search
USPC ......... 709/217–219, 227–230, 236, 204–207, 709/226, 246; 715/513
See application file for complete search history.

(56) References Cited

U.S. PATENT DOCUMENTS

| | | | |
|---|---|---|---|
| 5,283,856 A | 2/1994 | Gross et al. | |
| 5,627,997 A | 5/1997 | Pearson et al. | |
| 5,802,253 A | 9/1998 | Gross et al. | |
| 5,926,100 A | 7/1999 | Escolar | |
| 6,092,102 A | 7/2000 | Wagner | |
| 6,125,391 A * | 9/2000 | Meltzer et al. | 709/223 |
| 6,182,118 B1 | 1/2001 | Finney et al. | |
| 6,347,307 B1 | 2/2002 | Sandhu et al. | |
| 6,493,696 B1 | 12/2002 | Chazin | |
| 6,513,129 B1 | 1/2003 | Tentij et al. | |
| 6,560,611 B1 | 5/2003 | Nine et al. | |
| 6,563,800 B1 * | 5/2003 | Salo et al. | 370/264 |
| 6,564,264 B1 | 5/2003 | Creswell et al. | |

(Continued)

FOREIGN PATENT DOCUMENTS

WO     WO-00/74193     12/2000

OTHER PUBLICATIONS

N. Muller: "Focus on OpenView". CBM Books, 1995, 9 pages.

*Primary Examiner* — Kenny Lin

(57) ABSTRACT

A method for processing an incoming message in substantially real-time is provided. The method may include receiving the incoming message in response to a condition associated with a client device. The incoming message may be processed using a message handler and an approved rule. The approved rule may be operatively associated with an approved message structure that is compatible with a backend system. The processed message may be provided to the backend system in the approved message structure. The method may also include sending a reply message to a destination.

27 Claims, 6 Drawing Sheets

(56) References Cited

U.S. PATENT DOCUMENTS

| | | | |
|---|---|---|---|
| 6,591,260 B1 * | 7/2003 | Schwarzhoff et al. | 707/2 |
| 6,631,363 B1 | 10/2003 | Brown et al. | |
| 6,701,378 B1 | 3/2004 | Gilhuly et al. | |
| 6,704,874 B1 | 3/2004 | Porras et al. | |
| 6,714,977 B1 | 3/2004 | Fowler et al. | |
| 6,742,054 B1 * | 5/2004 | Upton, IV | 710/6 |
| 6,748,555 B1 | 6/2004 | Teegan et al. | |
| 6,753,889 B1 * | 6/2004 | Najmi | 715/784 |
| 6,772,180 B1 * | 8/2004 | Li et al. | 715/513 |
| 6,789,077 B1 * | 9/2004 | Slaughter et al. | 707/10 |
| 6,795,778 B2 | 9/2004 | Dodge et al. | |
| 6,816,865 B2 * | 11/2004 | O'Brien et al. | 707/100 |
| 6,826,597 B1 * | 11/2004 | Lonnroth et al. | 709/207 |
| 6,832,341 B1 | 12/2004 | Vijayan | |
| 6,918,084 B1 | 7/2005 | Slaughter et al. | |
| 6,920,502 B2 * | 7/2005 | Araujo et al. | 709/229 |
| 6,971,096 B1 | 11/2005 | Ankireddipally et al. | |
| 7,072,934 B2 * | 7/2006 | Helgeson et al. | 709/203 |
| 7,072,985 B1 * | 7/2006 | Lev-Ami et al. | 709/246 |
| 7,093,005 B2 | 8/2006 | Patterson | |
| 7,162,534 B2 | 1/2007 | Schleiss et al. | |
| 7,188,158 B1 * | 3/2007 | Stanton et al. | 709/220 |
| 7,200,684 B1 | 4/2007 | Schales et al. | |
| 7,224,979 B2 | 5/2007 | Singhal et al. | |
| 7,243,130 B2 | 7/2007 | Horvitz et al. | |
| 7,249,159 B1 | 7/2007 | Horvitz et al. | |
| 7,269,625 B1 | 9/2007 | Willhide et al. | |
| 7,313,608 B1 | 12/2007 | Swedor et al. | |
| 2001/0037404 A1 * | 11/2001 | Hafsteinsson et al. | 709/246 |
| 2001/0051890 A1 | 12/2001 | Burgess | |
| 2002/0019584 A1 | 2/2002 | Schulze et al. | |
| 2002/0035584 A1 | 3/2002 | Scheier et al. | |
| 2002/0059566 A1 * | 5/2002 | Delcambre et al. | 717/146 |
| 2002/0091539 A1 | 7/2002 | Yin et al. | |
| 2002/0111876 A1 * | 8/2002 | Rudraraju et al. | 705/26 |
| 2002/0169825 A1 | 11/2002 | Hougland et al. | |
| 2002/0198667 A1 | 12/2002 | Dodge et al. | |
| 2002/0198931 A1 | 12/2002 | Murren et al. | |
| 2003/0009543 A1 | 1/2003 | Gupta | |
| 2003/0028447 A1 * | 2/2003 | O'Brien et al. | 705/27 |
| 2003/0069848 A1 | 4/2003 | Larson et al. | |
| 2003/0144746 A1 | 7/2003 | Hsiung et al. | |
| 2003/0167456 A1 * | 9/2003 | Sabharwal | 717/108 |
| 2003/0182395 A1 * | 9/2003 | Lynch et al. | 709/218 |
| 2006/0015565 A1 * | 1/2006 | Nainani et al. | 709/206 |
| 2006/0095530 A1 * | 5/2006 | Daniell et al. | 709/206 |

* cited by examiner

ServiceRequest_Reply.DTD ← 502

```
<!ELEMENT ServiceRequest_Reply (Base_Info,Case_Info)>
<!ELEMENT Base_Info (Sender,Receiver,UniqueId,Operation)>
<!ELEMENT Sender (#PCDATA)>
<!ELEMENT Receiver (#PCDATA)>
<!ELEMENT UniqueId (#PCDATA)>
<!ELEMENT Operation (#PCDATA)>
<!ELEMENT Case_Info (SRNumber,ReplyStatus,ReplyMessage)>
<!ELEMENT SRNumber (#PCDATA)>
<!ELEMENT ReplyStatus (#PCDATA)>
<!ELEMENT ReplyMessage (#PCDATA)>
```

FIG. 5

AUTOMATED PROCESSING OF SERVICE REQUESTS USING STRUCTURED MESSAGING PROTOCOLS

CROSS REFERENCE TO RELATED APPLICATIONS

This application is a continuation-in-part of U.S. patent application Ser. No. 09/879,816 filed on Jun. 12, 2001, the disclosure of which is hereby incorporated by reference herein. This application also claims priority under 35 U.S.C. §119 based on U.S. Provisional Patent Application 60/571,947 filed May 17, 2004, the contents of which is also hereby incorporated by reference herein.

FIELD OF THE INVENTION

The present invention relates generally to processing service requests in computer networks and more particularly to the automated processing of service requests using structured messaging protocols.

BACKGROUND OF THE INVENTION

Networked applications have become prevalent in business, government, education, and with individual users. As networked applications become more ubiquitous, users may require access to greater-and-greater capabilities. In order to satisfy this demand, application service providers (ASPs) and users, such as corporations, may run increasingly complex systems. Complexity may arise because ASPs and users are connecting numerous pieces of equipment and software applications together to provide robust functionality. In many instances, the integrated equipment and software applications may be from various manufacturers. As a result, troubleshooting malfunctions may be cumbersome and time consuming.

Users may outsource the maintenance and/or support of their networks and equipment to third parties. Outsourcing may let users utilize entities having expertise in managing complex systems. For example, users may rely on the ASP for maintenance and support of hardware/software at the user premises as well as the hardware/software at the ASP facilities. Since ASPs may service many clients, automating problem reporting, problem diagnosis and problem resolution may be cost prohibitive due to the large number and/or types of computers and software applications being administered. As a result, ASPs may rely on manual processes for reporting, diagnosing and resolving problems. For example, a customer may call a help desk operator when a problem is discovered. The help desk operator may connect the customer with a specialist in order to diagnose the problem. When the problem is diagnosed, the specialist or the customer may have to contact a repair department to obtain, for example, a new software release. The customer may have to manually install the new software on its system to repair the problem.

In the above example, portions of the problem reporting, diagnosis and repair process were manually executed. Manual execution refers to processes substantially performed, or carried out by people. In contrast, automated execution refers to processes substantially performed by machine with little or no human intervention. Employing people in the problem reporting, diagnosis, and repair stages may cause delays and add to operating costs when compared to problem reporting, diagnosis, and repair stages that could be automated.

SUMMARY OF THE INVENTION

In accordance with an aspect, the invention addresses this and other needs by providing call pickup functionality in a data communications network.

In accordance with one aspect, a system for handling messages is provided. The system may include, a schema module configured to provide a first message handling rule based on a first schema and a second message handling rule based on a second schema. The first message handling rule may facilitate translation of an incoming message including incoming information. The second message handling rule may facilitate making a backend message available to a backend device. The system may include a message handler including a processor configured to receive the incoming message, translate the incoming message using the first message handling rule to extract the incoming information, and publish the incoming information using the second message handling rule.

In accordance with another aspect, a method for processing an incoming message in substantially real-time is provided. The method may include receiving the incoming message in response to a condition associated with a client device. The incoming message may be processed using a message handler and an approved rule. The approved rule may be operatively associated with an approved message structure that is compatible with a backend system. The processed message may be provided to the backend system in the approved message structure. The method may include sending a reply message to a destination.

In accordance with still another aspect, a message handler for automatically processing an incoming message including client information and client data received from a sender over a network is provided. The message handler may include a network interface configured to accept the incoming message, to generate a reply message, and to forward a backend message. The message handler may include a validator configured to validate the incoming message to determine if the sender is authorized, and to determine if the client information and the client data are valid. The message handler may include a translator configured to translate the incoming message using a client schema, where the client schema is used to parse the incoming message to facilitate extraction of the client information and the client data. The message handler may include a publisher configured to provide the backend message to the network interface in a format compliant with a backend schema, where the backend message includes valid client information and valid client data.

In accordance with yet another aspect, a system for processing an incoming message having an incoming format and received over an external network is provided. The system may include a means for receiving the incoming message via a network interface, a means for accessing a schema associated with the incoming format, a means for parsing the incoming format to extract incoming information from the incoming message, a means for translating the incoming format into an outgoing format for use with a backend device using the schema, where the translating means converts the incoming information into the outgoing format, and a means for publishing an outgoing message including the incoming information in the outgoing format, where the publishing means makes the outgoing message available to the backend device for processing.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 illustrates an exemplary schema that may be used to generate a service request reply that is compatible with implementations of the message handler of FIG. 2 and the message handler modules of FIG. 3 consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

EXEMPLARY SYSTEM

Figure 1:
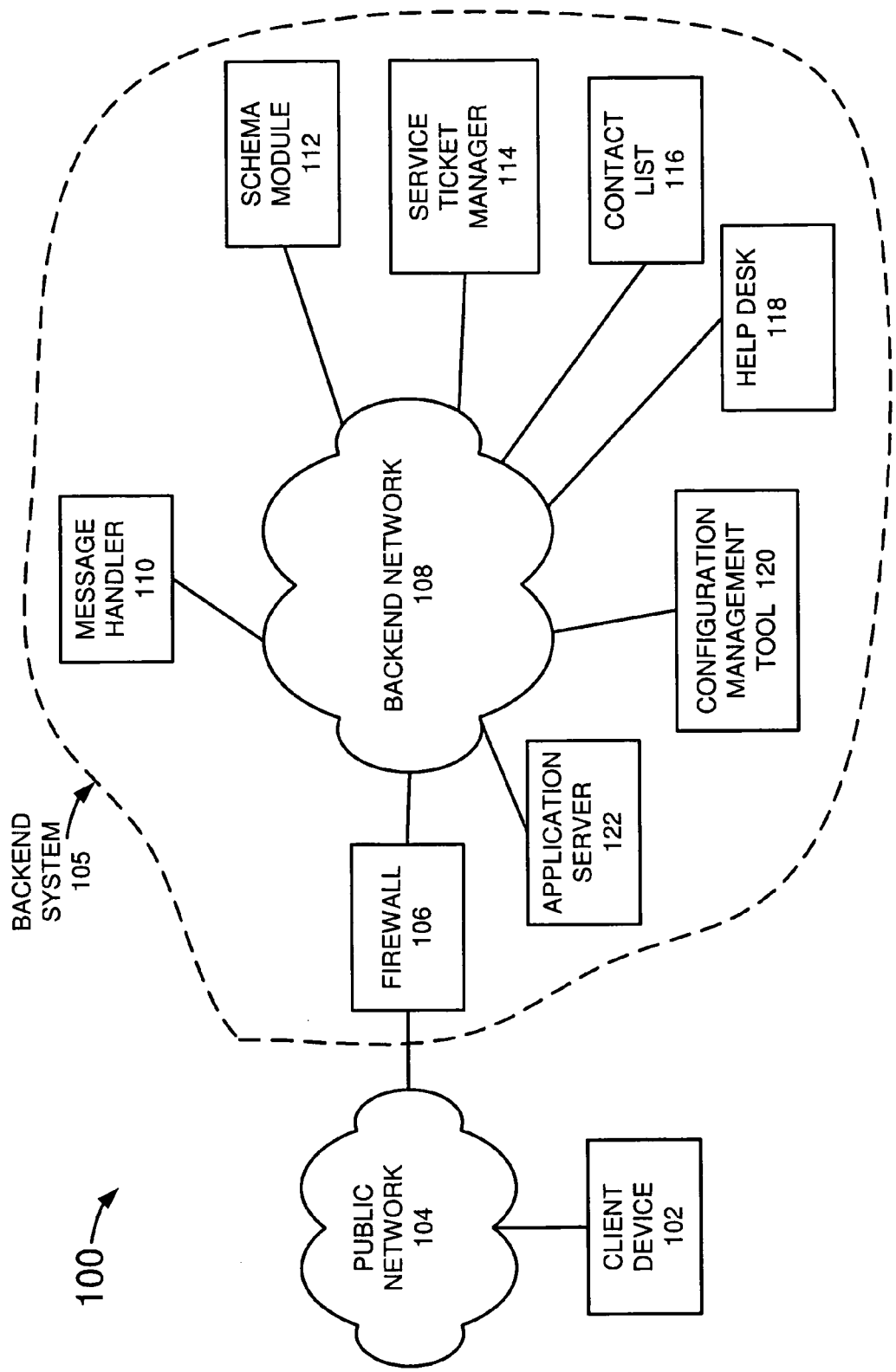
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a client device 102, a public network 104, and a backend system 105. The number of devices illustrated in FIG. 1 is provided for simplicity. In practice, a typical system could include more or fewer devices than illustrated in FIG. 1. In addition, devices depicted as single entities in FIG. 1 may be implemented in a distributed fashion, such as in a parallel implementation.

Client device 102 may include any device capable of initiating or receiving a service request using public network 104. A service request may include any manual or automated request for assistance. For example, a service request may be for assistance with a hardware and/or software problem. In addition, a service request may include the reporting of a hardware and/or software configuration to a destination device, such as an ASP. Client device 102 may include a single computer or multiple computers connected by a network, such as a client side local area network (LAN). Client device 102 may be associated with a customer or end user, such as a corporation or an individual user. Client device 102 may have a business or service relationship with backend system 105 and the backend devices connected thereto. For example, client device 102 may subscribe to backend system 105 for repair services covering a corporate LAN and the computers and/or software operating thereon. Client device 102 may communicate with backend system 105 using, for example, a leased line and/or a dedicated connection, such as, a persistent connection.

Public network 104 may include one or more networks, such as the Internet, an intranet, a LAN, a metropolitan area network (MAN), a wide area network (WAN), or another type of network that is capable of transmitting data from a source device to a destination device. Public network 104 may include one or more public switched telephone networks (PSTNs) or other types of switched networks. In addition, public network 104 may include one or more data networks operating via substantially any protocol, such as asynchronous transfer mode (ATM), synchronous optical transport (SONET), Internet Protocol (IP), or Bluetooth. Public network 104 may include hardwired connections, such as shielded twisted pairs, coaxial cables, optical fibers, and/or waveguides. Alternatively, public network 104 may include wireless links, such as free space optical links, and/or free space acoustic links. Public network 104 may operate as an external network relative to backend network 108.

Backend system 105 may include a firewall 106, a backend network 108, a message handler 110, a schema module 112, a service ticket manager 114, a contact list 116, a help desk 118, a configuration management tool 120, and an application server 122. The devices and systems, excluding backend network 108, making up backend system 105 are collectively referred to as backend devices and individually as a backend device.

Firewall 106 may include any device capable of receiving datagrams from a network. Datagram as used herein refers to any type of machine-readable data unit having substantially any format (e.g. bit, byte, chunk, packet, etc.) and capable of injection onto a network. Datagrams may further include function-executable code for causing a processor to perform a determined series of operations. Still further, datagrams may further traverse the network by passing through one or more network devices before being made available to a destination device. Datagrams may further undergo conversions and manipulation en route through a network.

Firewall 106 may receive datagrams from an unsecured network, such as public network 104, via, for example, a public interface. Firewall 106 may examine received datagrams and allow only a portion of the datagrams to reach a secure network, such as backend network 108, via, for example, a private interface. Firewall 106 may pass only those datagrams originating from a certain source address and/or datagrams not infected with malicious code, such as Trojans, worms, viruses, spyware and/or other malware. Datagrams containing malicious code and/or originating from, for example, an unknown source address may be discarded by firewall 106. Firewall 106 may examine datagrams for other parameters, such as destination addresses, data formats, compliance with network security protocols, etc. Firewall 106 may facilitate certain types of communication sessions, such as virtual private network (VPN) sessions.

Backend network 108 may include one or more networks capable of carrying datagrams received from a source to a destination. Backend network 108 may include, for example, a LAN operating in conjunction with a contact center. Contact center as, used herein, refers to any source and/or destination that processes a service request received from a sender. For example, a contact center may be associated with a communication services provider that provides hardware and/or software maintenance and support to client device 102 in conjunction with provisioning communication services thereto. Backend network 108 may include network devices, such as routers, switches, firewalls, and hubs, for facilitating communication among backend devices associated with service request processing.

Message handler 110 may include any device configured to receive data from devices, such as client device 102. For example, message handler 110 may include a server configured to receive a service request from client device 102. Service request, as used herein, refers to any message associated with a request. The request may be associated with, for example, provisioning, maintenance, upgrade, re-configuration, and/or replacement of hardware, software and/or services associated with an entity, such as a customer. For example, a service request may include a request for assistance with upgrading memory on a computer associated with a customer.

Message handler 110 may be configured using hardware and/or software to receive a service request and parse it for use with other backend devices. Message handler 110 may convert a message received in a client device format into one or more formats used by backend devices. For example, message handler 110 may convert a client formatted service request into a standardized format used by all backend devices. Alternatively, message handler 110 may convert a client formatted request into a number of formats for use by respective backend devices, such as schema module 112, service ticket manager 114, contact list 116, help desk 118, configuration management tool 120, and application server 122. Message handler 110 may determine which of the backend devices should receive the entire service request and/or message handler 110 may parse the service request into parts before sending only relevant parts to respective backend devices. Message handler 110 may receive messages from backend devices and send them to client device 102 in a client device format. Message handler 110 may interact with other devices, such as third party devices, associated with, for example, a financial institution, a parts supplier, a delivery company, etc. Third parties may be related to client device 102 and may subscribe to a client-defined message format associated with client device 102.

Schema module 112 may include any device configured to assist message handler 110 with interpreting the contents of a message. Schema refers to a message structure, framework and/or rule set for generating and/or processing messages. Messages may employ one or more common schema which can be interpreted by all destination devices or messages may employ unique schema understood by a subset of destination devices. Schema may be used by backend devices such as message handler 110, schema module 112, service ticket manager 114, contact list 116, help desk 118, configuration management tool 120 and application server 122 for interpreting message contents. Schema module 112 may provide message handler 110 with schema for use in exchanging and/or processing messages received from client device 102 and/or backend devices. Schema provided to message handler 110 may include approved rules. Approved rules may meet one or more pre-determined criteria associated with an approving entity, such as application server 122 and/or configuration management tool 120.

For example, client device 102 may employ a unique client-defined message format using a client-defined schema. Client device 102 may send a service request to message handler 110 in the client-defined format. Message handler 110 may convert the unique format into a format understood by at least a subset of the backend devices. Message handler 110 may obtain a client-defined schema from schema module 112 for use in processing the service request. Message handler 110 may apply the client device schema to the service request to facilitate extraction of client information and client data included in the request. Message handler 10 may use a backend system schema, obtained from schema module 112, to reformat extracted client information and client data into a message structure compatible with backend devices that may be used to process the service request.

In one implementation, schema module 112 may operate to provide message handler 110 with a common schema for use with backend devices. Use of a common schema may facilitate efficient processing of messages, such as service requests, because message translations between message handler 110 and backend devices, and vice versa, may be substantially or completely eliminated. Schema defined by backend devices, such as message handler 110, may be referred to as internally defined schema, whereas schema defined by an entity associated with public network 104, such as client device 102, may be referred to as externally defined schema.

Service ticket manager 114 may include any device capable of opening a new service ticket, associating a current service request with an existing service ticket and/or for closing a service ticket. Service tickets may refer to any technique, device or mechanism used to associate a unique identifier with a service request. For example, a service request number, also referred to as a service ticket number, may be associated with a service ticket to provide a unique identifier for tracking the service ticket in backend system 105. For example, a service request number may include a numeric and/or alphanumeric designation alone or in combination with other information, such as a customer name, customer location, customer number, date and/or time, machine name and/or model number, and/or program name and/or license key number. In one implementation, service ticket manager 114 is a server operating in conjunction with backend network 108 and other backend devices. In one implementation, service ticket manager 114 provides message handler 110 with a service ticket number in response to a request from message handler 110.

Contact list 116 may include any device capable of maintaining a database of contact information associated with an entity, such as a customer, client device, service provider, manufacturer, and/or third party. For example, contact list 116 may include a database containing names and/or identifying information associated with customers subscribing to maintenance and support services associated with a backend system 105. Contact list 116 may interact with message handler 110 and service ticket manager 114 to process service requests received from client device 102. Contact list 116 may also include a database of entities that should be contacted in pre-determined situations. For example, contact list 116 may include the name of an individual, such as an information technology (IT) specialist, who should be contacted when certain problems are reported by client device 102. In one implementation, contact list 116 may contact designated individuals via recorded messages played over a telephone line, via email messages, pager messages, etc.

Help desk 118 may include any device capable of assisting a user and/or customer associated with client device 102. For example, help desk 118 may be accessed by a user of client device 102 using a telephone, email, web-based interface, etc. Help desk 118 may interact with the user via an interactive voice response (IVR) system, an operator, and/or via a graphical user interface (GUI). Help desk 118 may provide the user with information useful for addressing problems associated with client device 102 and/or with information on how to submit a service request using message handler 110.

Configuration management tool 120 may include any device capable of monitoring a configuration associated with computer hardware and/or software, a network, and/or a group of devices operating as a system. Configuration management tool 120 may determine the acceptability of making changes to the components associated with a hosted application. For example, configuration management tool 120 may determine if it is acceptable to install additional random access memory (RAM) in a server used to host an application and/or to upgrade an operating system associated with the server. Configuration management tool 120 may use, for example, a knowledge base when determining if actions should be performed.

Application server 122 may include any device capable of hosting one or more software and/or hardware applications. Application server 122 may include application components, such as software applications for providing services and/or applications to backend system 105 and/or client device 102. For example, application server 122 may host application components for diagnosing memory faults associated with client device 102, for maintaining a parts inventory database, for provisioning communication services to client device 102, and for controlling the integrated operation of other backend devices, such as message handler 110, schema module 112, service ticket manager 114, etc. Application server 122 may include, for example, a single server and/or may include multiple servers operatively coupled using, for example, backend network 108.

Figure 2:
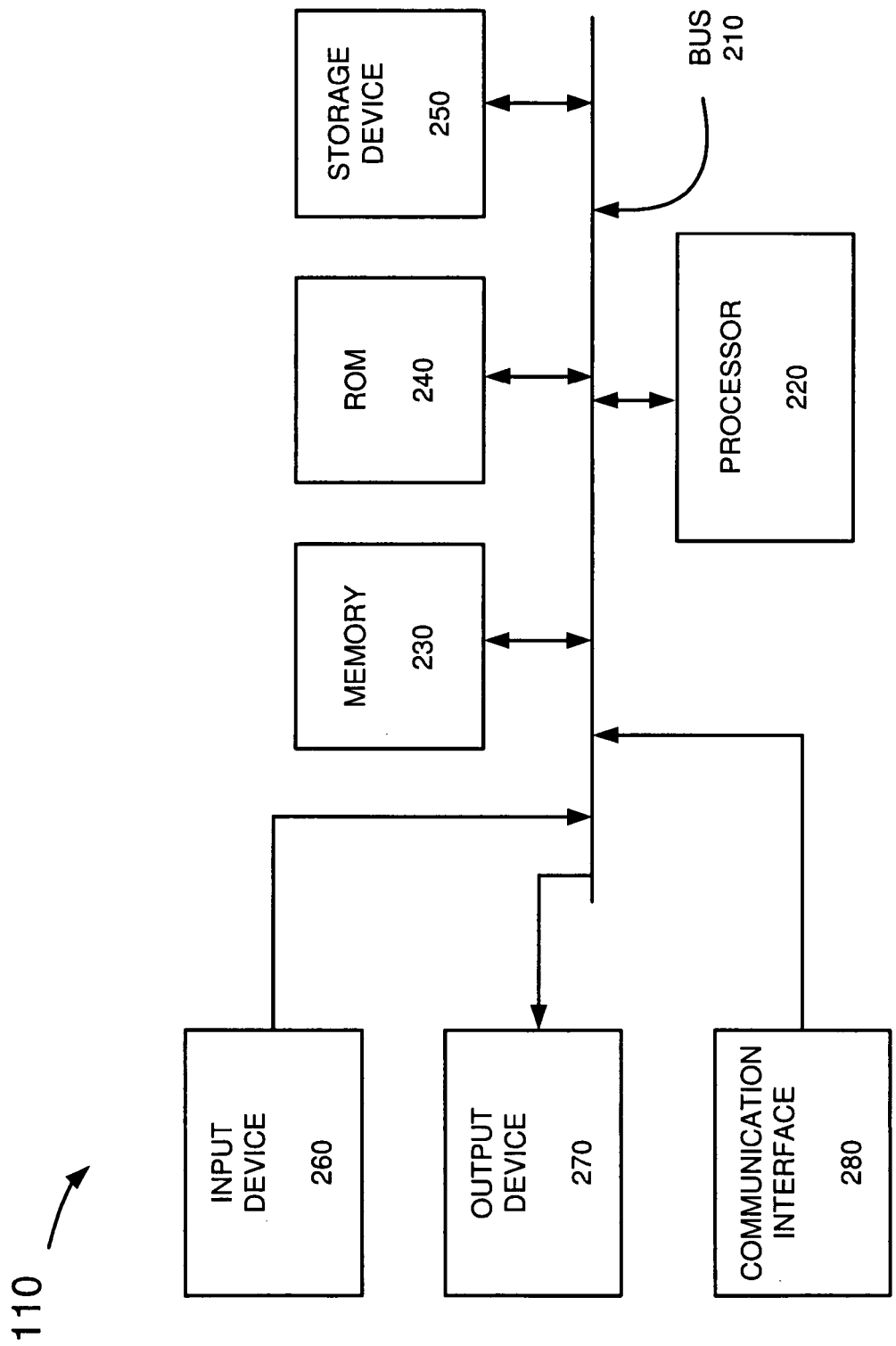
FIG. 2 illustrates an exemplary configuration of a message handler in an implementation consistent with the principles of the invention.

FIG. 2 illustrates an exemplary configuration of message handler 110 in an implementation consistent with the principles of the invention. It will be appreciated that client device 102, firewall 106, schema module 112, service ticket manager 114, contact list 116, help desk 118, configuration management tool 120 and application server 122 may be similarly configured. As illustrated, message handler 110 may include a bus 210, a processor 220, a memory 230, a read only memory (ROM) 240, a storage device 250, an input device 260, an output device 270, and a communication interface 280. Bus 210 may include one or more conventional buses that permit communication among the components of message handler 110.

Processor 220 may include any type of conventional processor or microprocessor that interprets and executes instructions. Memory 230 may include a RAM or another type of dynamic storage device that stores information and instructions for execution by processor 220. Memory 230 may also be used to store temporary variables or other intermediate information during execution of instructions by processor 220.

ROM 240 may include a conventional ROM device and/or another type of static storage device that stores static information and instructions for processor 220. Storage device 250 may include a magnetic disk or optical disk and its corresponding drive and/or some other type of magnetic or optical recording medium and its corresponding drive for storing information and/or instructions.

Input device 260 may include any conventional mechanism or combination of mechanisms that permits the operator to input information to message handler 110, such as a keyboard, a mouse, a microphone, a pen-based pointing device, a biometric input device, such as a voice recognition and/or a finger print scanning device. Output device 270 may include any conventional mechanism or combination of mechanisms that outputs information to the operator, including a display, a printer, a speaker, etc.

Communication interface 280 may include any transceiver-like mechanism that enables message handler 110 to communicate with other devices and/or systems, such as schema module 112. For example, communication interface 280 may include a modem and/or an Ethernet interface or port. Alternatively, communication interface 280 may include other mechanisms for communicating via a data network, such as backend network 108 and/or public network 104.

Message handler 110 may implement the functions described below in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Exemplary Message Handler Configuration

Figure 3:
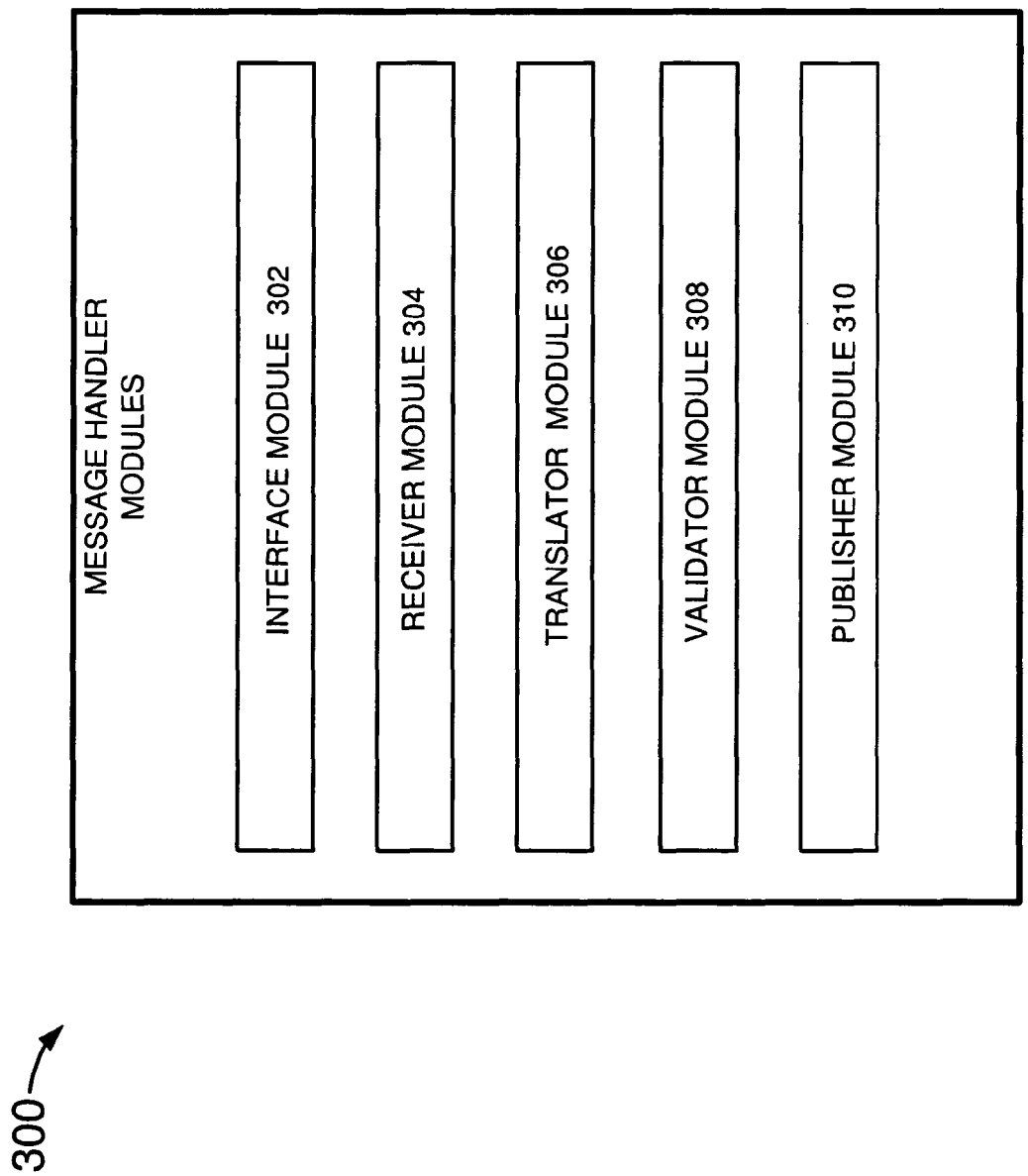
FIG. 3 illustrates an exemplary configuration of message handler modules that can be used in conjunction with the message handler of FIG. 2 consistent with the principles of the invention.

FIG. 3 illustrates an exemplary configuration of message handler modules that can be used in conjunction with an implementation of message handler 110 of FIG. 2 consistent with the principles of the invention. Message handler 110 may include components or modules for facilitating message exchanges with client device 102 and backend devices. In one implementation, message handler 110 may include an interface module 302, a receiver module 304, a translator module 306, a validator module 308, and a publisher module 310.

Interface module 302 may include hardware and/or software for interfacing message handler 110 with backend system 105. For example, interface module 302 may interface message handler 110 to backend network 108 using a first interface, such as a network interface card (NIC), may interface to schema module 112 using a second interface, and may interact with application server 122 using a third interface. Interface module 302 may communicate with the first, second and third interfaces using one or more communication protocols. Interface module 302 may receive service requests initiated by a customer, such as client device 102, may receive service requests associated with an existing service request number, or work order number, may receive service requests from a third party on behalf of a customer, and may receive messages, such as service requests, generated by backend system 105.

Receiver module 304 may include hardware and/or software for receiving messages and sending messages. Receiver module 304 may cooperatively operate with interface module 302 for receiving messages from backend network 108. For example, interface module 302 may include a hardware interface for accepting a client message from backend network 108. Interface module 302 may make the client message available to receiver module 304. Receiver module 304 may perform processing, such as error checking and/or decryption of encrypted client messages before making the client message available to translator module 306.

Translator module 306 may include hardware and/or software for translating messages into a structure, or format, compatible with message handler 110. Translator module 306 may receive messages from receiver module 304 in, for example, a client-defined format. Translator module 306 may convert the client-defined message into one or more formats compatible with backend devices. Translator module 306 may employ a rule set for parsing messages to extract information contained therein. For example, translator module 306 may receive approved rules, in the form of schema, from schema module 112. Schema may be used by message handler 110 to generate a structured message format for use with backend devices, client device 102, and/or third party devices. Use of a structured message format may facilitate efficient processing by devices subscribing to the format.

A structured format may be a client-defined format, a backend device-defined format, or a common format. A client-defined format may be determined by a client device and/or by another external entity. A backend device-defined format may be defined by a backend device for use with that device. A common format may refer to a structured format that is understood by multiple devices, such as all devices operating in backend system 105. For example, a backend device-defined format that is understood by all devices operating on backend network 108 may be considered a common format. A common format may also be used with external devices, such as client device 102, subscribing to the common format.

Translator module 306 operating in conjunction with schema module 112 may use a structured message format to facilitate automated case management and processing of service requests. For example, message handler 110 may employ a markup language based messaging structure, or schema. Markup languages employ a syntax utilizing tags for referencing data within messages and/or files. Examples of markup languages that can be used with backend system 105 are, but are not limited to, extensible markup language (XML), XML-remote procedure call (RPC), simple object access protocol (SOAP), and/or hypertext markup language (HTML).

By way of example, XML is a markup language that utilizes tags to denote the structure, or format, of data within an XML file which is referred to as a document. An XML document may include data and tags. Data is the actual content within a document, and an example of data may be character text. An XML element may denote the components of an XML document. The XML element may contain data and/or other elements, referred to as sub-elements. XML elements may be nested, thus providing additional structure to the markup language document. For example, an XML, or other markup language, document may include tags that are surrounded by markups which are open and closed brackets, "<" and ">", respectively. These tags may serve as handles for identifying elements within an XML document. For example, a tag for identifying a customer name may appear as <customer name>. As such, tags make XML documents easy to parse using readily available XML parsers. When elements are parsed, other software routines, modules, or applications may use the data contained in and/or referenced by the elements.

For example, message handler 110, operating in conjunction with schema module 112, may employ a format for service request messages (hereinafter service request) for use with backend devices. An exemplary, and non-limiting, hierarchy of tags for an XML document that may be used in a service request may appear as:

```
<customer name>
    <customer location>
        <device model number>
            <operating system>
                <error log>
```

From the example above, it can be seen that customer name is the root element since it does not reside below another element, and sub elements below the root element describe aspects about the customer, such as a problem associated with a particular computing device, in greater and greater detail. When backend devices are provided with the schema, or structure, for service requests, the backend devices may efficiently parse received messages to extract relevant information. An XML document may be defined using a document type definition (DTD). A DTD may be a framework for defining the structure of an XML document. The DTD can be provided to devices interacting with the XML document to allow the devices to generate compliant XML documents, such as service requests, and to parse XML documents received from other devices.

XML may be platform and operating system independent. As a result, XML may facilitate communication among devices running disparate operating systems, programming languages, hardware, software applications, etc., by providing a standardized message structure that can be processed by these devices using available XML parsers. The use of structured messages, such as XML based messages, may reduce and/or eliminate the need for maintaining specialized software conversion utilities for devices associated with backend system 105.

Validator module 308 may include hardware and/or software for validating the structure, content, and/or authority of messages received by message handler 110 and for validating the content of messages generated by message handler 110. Validator module 308 may receive a translated message from translator module 306. Validator module 308 may examine the content of the message to determine if data contained therein is valid. For example, validator module 308 may determine if client information, such as a customer name, customer account information are valid. Validator module 308 may also determine if client data is valid, such as hardware and/or software information, error logs, problem descriptions, etc. Validor module 308 may determine if client device 102 is authorized to make a particular type of service request. Valid client information, client data, and other information and/or data may comply with one or more formats, rules, identities, and/or parameters associated with backend system 105 using, for example, schema module 112, configuration management tool 120 and/or application server 122.

Publisher module 310 may include hardware and/or software for publishing approved schema, such as DTDs. Publisher module 310 may make schema and/or populated messages available to backend devices by sending approved schema to the devices and/or placing approved schema in an accessible location, such as in a memory or database operating on backend network 108. If publisher module 310 places approved schema and/or messages in an accessible location, publisher module 310 may send a message to backend devices to let them know where the schema and/or messages may be found. For example, a publisher module 310 message may tell backend devices that a new schema is available and may provide the backend devices with a link or machine-readable instructions for obtaining the new schema and/or message from, for example, a database or a web site. Publisher module 310 may provide a centralized location for making approved schema available to client devices and/or backend devices. For example, client device 102 may benefit from faster processing of service requests when an approved schema is used to generate service requests. Faster processing may be possible because translator module 306 may not have to operate on messages submitted in an approved structure. For example, publisher module 310 may send approved schema to devices, such as client device 102. Publisher module 310 may provide client device 102 with an approved schema for use when generating service requests. Schema may be updated to incorporate new features, to operate with new devices, to correct errors, etc. Publisher module 310 may notify client device 102 and backend devices when new schema are available for use.

Message handler 110 may implement internal rules in conjunction with the operation of interface module 302, receiver module 304, translator module 306, validator module 308 and publisher module 310 for accepting, processing, disseminating and responding to service requests. For example, message handler 110 may employ customer-based rules, customer-defined rules, service-based rules, and common rules.

A customer-based rule may include a procedure that is implemented upon occurrence of an event. For example, a customer-based rule may instruct message handler 110 to notify client device 102 when a memory allocation threshold is exceeded or when a fault associated with client device 102 is detected. Message handler 110 may automatically generate a message using translator module 306 and schema module 112. The message may be sent to client device 102. The message may be sent to client device 102 in a client-defined format or in a common format anytime the memory allocation is exceeded and/or anytime a fault is detected.

A customer-defined rule may include a procedure that is specified by a customer, such as a customer associated with client device 102. For example, a customer may specify that a third party should be notified when a memory allocation is exceeded. The customer may provide the customer-defined rule to message handler 110. When a memory allocation is exceeded, message handler 110 may automatically notify the third party, such as a random access memory (RAM) supplier or an IT specialist, about the memory allocation issue. A customer-defined rule may include customer-defined message syntaxes or schema. Customer-defined schema may be used to send, for example, a service request to message handler 110. Message handler 110 may use the customer-defined schema to parse the message before converting it into, for example, a common format using a backend system schema. Message handler 110 may automatically process the service request in real-time using the customer-defined schema and the backend schema.

A service-based rule may include a procedure that is based on a status associated with a customer. For example, a service provider may operate backend system 105. The service provider may notify customers about service provisioning issues according to a hierarchy defined by service levels that customers subscribe to. For example, a first customer may subscribe to a premium level of service and a second customer may subscribe to a standard level of service. If a provisioning fault is detected by the service provider, the first customer may be notified first since it subscribes to a higher level of service.

A common rule may include a procedure that is based on a status of an application associated with backend system 105. A common rule may cause message handler 110 to notify all customers having a particular service whenever an error is encountered with the service. For example, backend system 105 may host an application, such as an order processing application, using application server 122. If application server 122 crashes, a common rule may specify that every customer subscribing to the order processing application be notified about the crash.

Exemplary Schema

Figure 4:
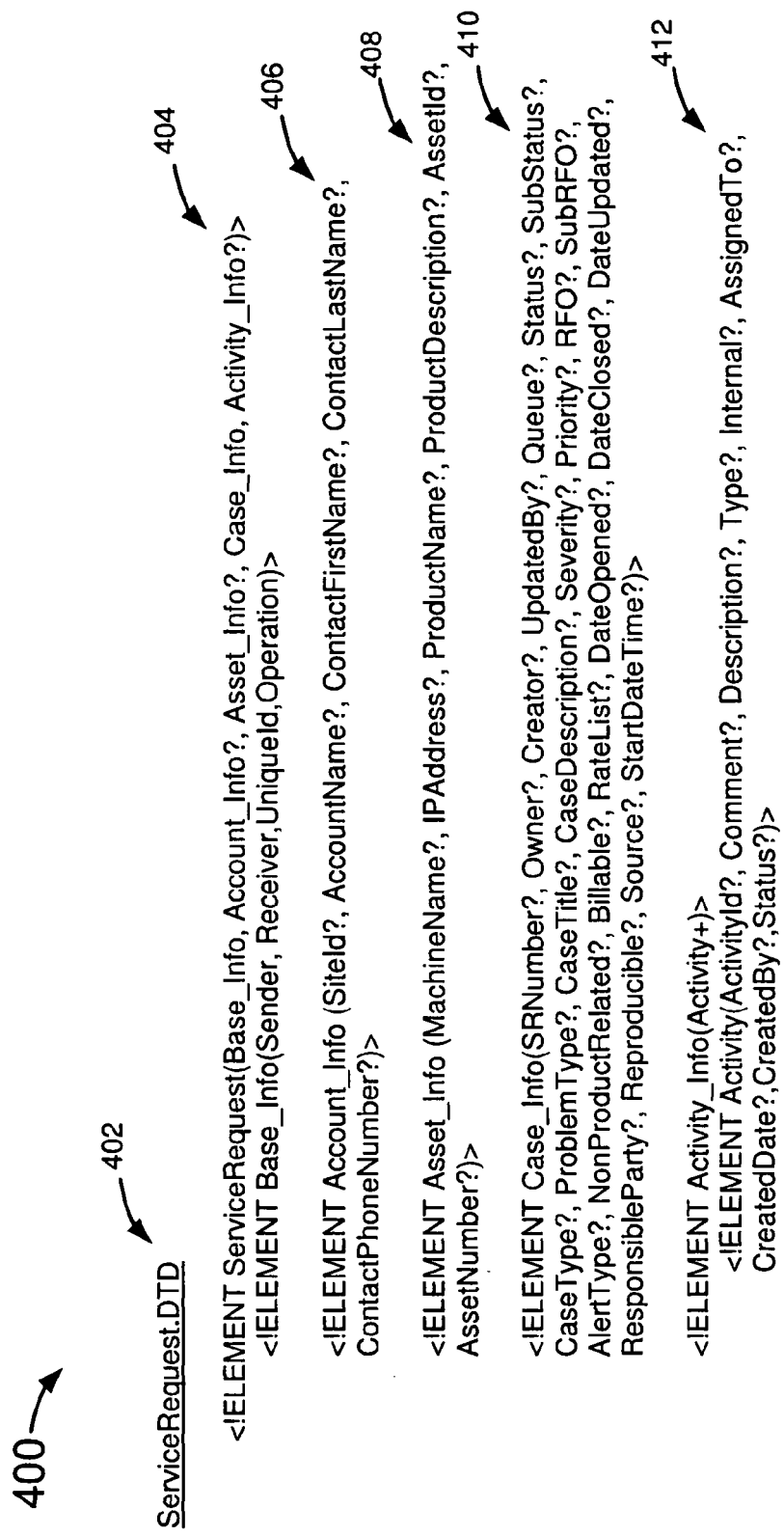
FIG. 4 illustrates an exemplary schema that may be used to generate a service request that is compatible with implementations of the message handler of FIG. 2 and the message handler modules of FIG. 3 consistent with the principles of the invention.

FIG. 4 illustrates an exemplary service request schema 400 that may be used to generate a service request that is compatible with implementations of message handler 110 of FIG. 2 and the message handler modules of FIG. 3 consistent with the principles of the invention. Service request schema 400 may be implemented as a Service request DTD 402 (hereinafter ServiceRequest.DTD 402) and may include a base information section 404, an account information section 406, an asset information section 408, a case information section 410, and an activity information section 412. The sections of ServiceRequest.DTD 402 may have one or more elements associated therewith and may provide a structure for including data in the request. The illustrated sections of ServiceRequest.DTD 402 are exemplary and other sections, elements, and/or data can be used.

Base information section 404 may include element names and contents (e.g., data). For example, base information section 404 may include data about the sender of the message, the receiver of the message, a document identifier, and/or operation. Sender information may identify the sender of the message. For example, a sender may be client device 102 and/or a user associated therewith. Sender information may include, for example, an Ethernet address, a customer number assigned by message handler 110, and/or a machine serial number. Receiver information may include a destination address associated with a recipient of the message. For example, recipient information may include a network address associated with message handler 110. A document identifier may include information uniquely identifying a schema associated with ServiceRequest.DTD 402. For example, a document identifier may identify a current revision of the schema used to generate ServiceRequest.DTD 402. Base information section 404 may include additional fields depending on requirements associated with backend system 105, client device 102 and/or a customer.

Account information section 406 may include element names and content about an account identifier, a contact person's first name, a contact person's last name and/or a phone number for the contact person. For example, an account identifier may include an account number associated with client device 102. Contact person's first name, last name, and phone number may include data for identifying a person responsible for the service request along with information for contacting the person. Account information section 406 may include additional fields depending on requirements associated with backend system 105, client device 102 and/or a customer.

Asset information section 408 may include data and/or content about a particular piece of hardware and/or software associated with a service request. For example, asset information section 408 may include an IP address of a device, such as a workstation, that encountered a malfunction. A machine name may include data associated with, for example, a domain name service (DNS) identifier and/or a name that a customer associates with the machine. A product name may be associated with a name, and/or other identifying information, associated with, for example, a software application running on a machine identified in the machine name field and/or IP address field. A product description may include a description of the software application identified in, for example, the product name field. Asset information section 408 may include additional fields depending on requirements associated with backend system 105, client device 102 and/or a customer.

Case information section 410 may include element names and/or content about one or more operational issues being tracked by backend system 105 and/or that may be tracked by backend system 105. Case information section 410 may include data about a service request number, an owner, a creator, the name of a person updating the request, a processing queue, case status, a problem type, etc. For example, a case may be identified using a service request number, the name of an owner and/or the name of a creator, such as a programmer. Case information section 410 may include information about a date on which the case was opened and/or updated. Case information section 410 may include data about the severity of a reported problem, a priority associated with the reported problem, an alert identifying the reported problem and/or the status of the reported problem. Case information section 410 may include additional fields and data depending on requirements associated with backend system 105, client device 102 and/or a customer.

Activity information section 412 may include element names and/or content about activities associated with a reported problem or request for service. For example, activity information section 412 may include an activity identifier for identifying activities associated with the problem and/or request, comments entered by a customer, a description of activities associated with the problem and/or request, identification of a party that the problem and/or request has been assigned to, and/or identification of a creation date of the message.

In one implementation, ServiceRequest.DTD 402 may employ a schema 400 that is relatively simple and easy to understand. For example, tags, or sections, such as base information section 404, may be segregated in a manner facilitating comprehension by a customer. Schema 400 may also facilitate modification and enhancement of messages to address new requirements, applications and/or new customers. Schema 400 may also handle bi-directional message flows from a customer to backend system 105 and vice versa. Schema 400 may also facilitate creation of a service request by providing data in a subset of the sections associated with schema 400. For example, it may be possible to open a service request using only data in account information section 406, asset information section 408, and/or case information section 410. Schema 400 may facilitate multiple field updates using, for example, a single request, and schema 400 may support the creation of more than one activity simultaneously. While schema 400 is shown in FIG. 4 in an XML based implementation, other implementations are possible. For example, schema 400 may be implemented in an XML schema definition (XSD) language. In addition, schema 400 may be used in conjunction with other protocols, such as web service definition language (WSDL) and/or SOAP.

FIG. 5 illustrates an exemplary schema 500 that may be used to generate a service request reply that is compatible with the implementation of message handler 110 of FIG. 2 and the message handler modules of FIG. 3 consistent with the principles of the invention. For example, schema 500 may facilitate implementing a service request reply message such as a ServiceRequestReply.DTD 502. ServiceRequestReply. DTD 502 may include sections, such as element names for holding data associated with base information section 404 and/or case information section 410. For example, base information may include data identifying a sender of the reply message, a receiver of the reply message, a unique identifier associated with the reply message and/or information about an operation associated with the reply message. Case information section 410 may include data identifying a service request number associated with ServiceRequestReply.DTD 502. For example, a service request may have included a service request number uniquely identifying the request. The service request number in ServiceRequestReply.DTD 502 may match the service request number in the original service request. Case information section may include reply status data and/or data about a reply message.

Figure 6:
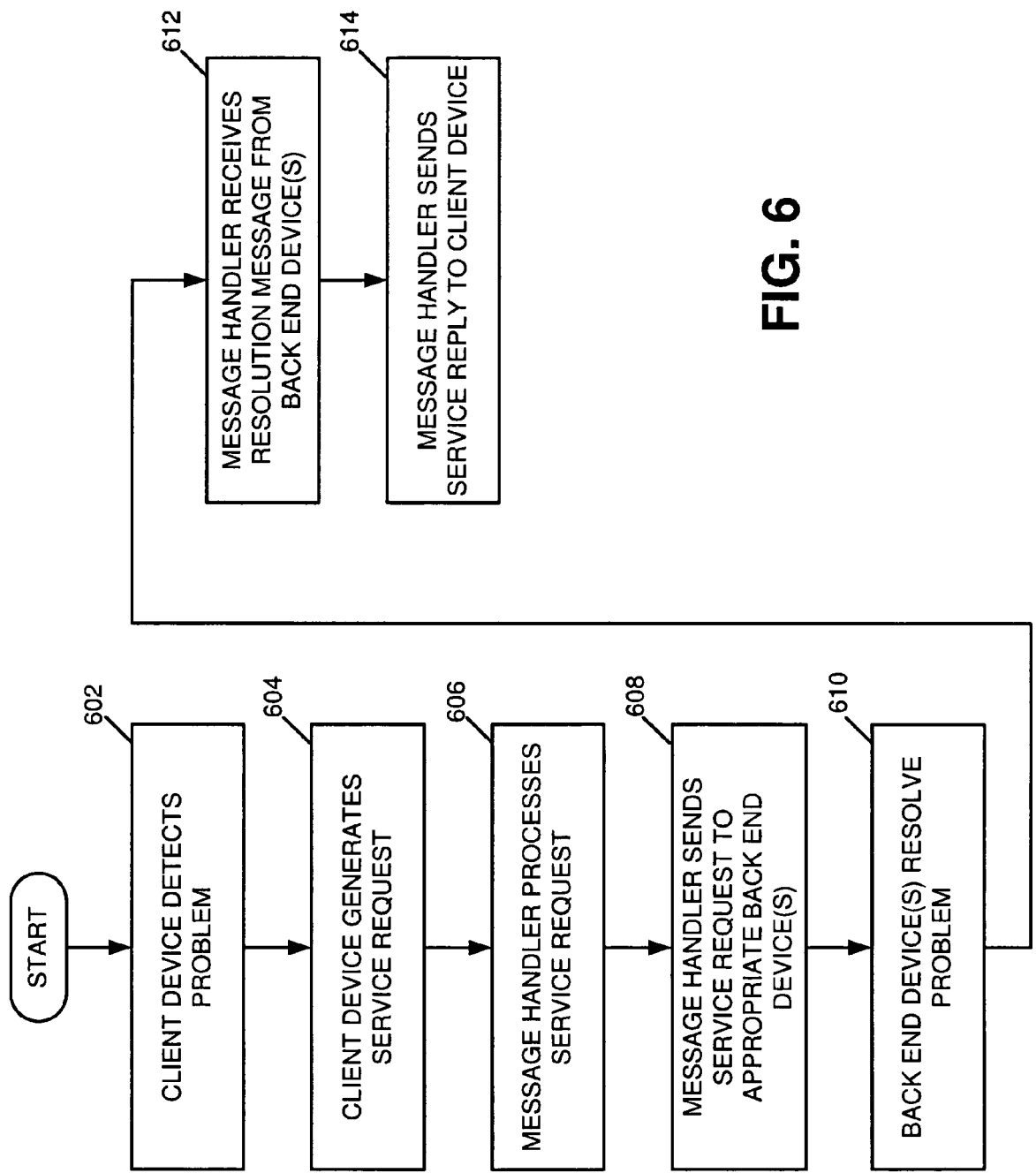
FIG. 6 illustrates an exemplary flow diagram showing processing associated with handling a service request in an implementation consistent with the principles of the invention.

FIG. 6 illustrates an exemplary flow diagram illustrating processing associated with handling a service request in an implementation consistent with the principles of the invention. Client device 102 may detect a hardware and/or software problem (act 602). For example, client device 102 may detect a message indicating that a server has used all of its available memory while running a software application. Usage of all memory may have generated, for example, a memory fault.

Client device 102 may generate a service request in a client-defined format and/or a standard, or common, format used by backend system 105. For example, client device 102 may generate a service request using schema 400. Schema 400 may be associated with a standard format understood by backend devices. Client device 102 may use ServiceRequest-.DTD 402 for generating a service request (act 604). Use of ServiceRequest.DTD 402 may facilitate substantially real-time processing by message handler 110 and other backend devices. The service request may include information about the machine on which the memory problem was encountered, the application program running at the time of the memory problem, the name and/or version number of the software application, customer account information, and/or contact information for an individual responsible for overseeing resolution of the memory problem at, for example, a customer's location where client device 102 is operating.

Message handler 110 may receive the service request in the form of a service request conforming to, for example, ServiceRequest.DTD 402 via interface module 302. Interface module 302 may pass the service request to receiver module 304. If the service request was encrypted by client device 102, receiver module 304 may decrypt the request before passing it to translator module 306. Translator module 306 may operate to process the service request using schema obtained from schema module 112 (act 606).

If the service request is of a standardized format, translator module 306 may use a standard schema for parsing the request. In contrast, if the service request is unique to client device 102, such as, for example, a client-defined format, translator module 306 may use a schema unique to service requests generated by client device 102. Translator module 306 may operate in a centralized mode or a distributed mode when processing a service request. When operating in a centralized mode, translator module 306 may be resident on message handler 110. In this mode, service requests may be translated into formats compatible with backend devices at message handler 110. In contrast, if translator module 306 operates in a distributed mode, components of translator module 306 may reside at backend devices using, for example, software agents. A software agent may be a self-contained and/or self-executing program that when launched performs a function. Software agents may facilitate integration with legacy hardware and/or software because of their self-contained nature. For example, a software agent operating as a plug-in may operate in conjunction with an input interface associated with, for example, help desk 118. When the service request is received at help desk 118, a software agent may perform the functions of translator module 306.

Validator module 308 may validate the content of the service request after it is parsed by translator module 306. Validator module 308 may ensure that proper data values reside in the respective fields defined by the schema. For example, validator module 308 may compare a value associated with an account number in the service request to an account number stored in a database, such as contact list 116. If the value in the service request matches the approved value stored in the database, validator module 308 may determine that the account number is valid. Validator module 308 may also validate the service request in other ways. For example, validator module 308 may determine if the client device is authorized to send an incoming message, determine if information included in an incoming message is valid, determine if a format of an incoming message is valid, determine if a message handler is authorized to process an incoming message, determine if a client device is associated with a valid account, determine if a message structure is valid, and/or determine if a backend system is authorized to receive a processed message to validate an incoming message. Validator module 308 may pass the request to publisher module 310 when information in the request is legitimate. In contrast, if validator module 308 determines that the account is not legitimate, validator module 308 may cause an error message to be reported.

Message handler 110 may make the validated request available to other backend devices using publisher module 310 (act 608). Publisher module 310 may operate in a publishing mode and/or in a subscribing mode when making schema, service requests, replies and other messages available to backend devices. In a publishing mode, publisher module 310 may send the entire service request to appropriate backend devices using a standardized format. For example, if the validated and translated service request is of a standardized format, publisher module 310 may send the entire message to backend devices capable of operating on the standardized format. Alternatively, publisher module 310 may send only relevant portions of the service request to respective backend devices. For example, if a backend device only operates on client identification information contained in a service request, publisher module 310 may make only the client information portion of the incoming message available to the backend device.

In a subscribe mode, publisher module 310 may make the service request available to backend devices via a centralized location. For example, publisher module 310 may place the service request in a database that is accessible to the backend devices. Backend devices involved in servicing the request may obtain a copy of the service request from the database. In a subscribe mode, publisher module 310 may send a notification to backend devices informing them that a new service request is posted. Publisher module 310 may facilitate synchronous or asynchronous messaging, with message handler 110, backend devices and/or client device 102.

One or more backend devices may receive the service request from publisher module 310. Backend device(s) receiving the service request may be involved with resolving the problem reported by client device 102 (act 610). Backend devices may operate individually or cooperatively to resolve the problem. Returning to the memory example, service ticket manager 114 may generate a service ticket number for the service request so that the request can be uniquely identified. Configuration management tool 120 may determine the amount and type of memory required by client device 102 for running the application program in an error free mode. Contact list 116 may identify a distributor of the appropriate type of memory, and help desk 118 and/or an ordering system may place an order for the memory. The ordered memory may, for example, be drop shipped directly to the customer from the distributor.

When the service request has been resolved, message handler 110 may be notified (act 612). Message handler 110 may be notified by individual backend device(s), or via a centralized reporting technique and/or device. If a centralized reporting technique and/or device is used, backend devices may contact the reporting technique and/or device when they are finished with their, respective, contributions to the solution. The centralized reporting technique and/or device may send a message to message handler 110 indicating that the service request has been addressed.

Message handler 110 may generate a service request reply message using publisher module 310, translator module 306 and/or interface module 302 (act 614). For example, message handler 110 may notify client device 102 that additional memory has been ordered and is being drop shipped to the customer. In addition, message handler 110 may propose a date and/or time for having a technician install the memory in client device 102. Client device 102, or a customer associated therewith, may confirm the proposed date. When the memory is installed, client device 102 may send a notification to message handler 110. The notification may cause message handler 110 to mark the service request as closed and/or complete. The notification may also cause message handler 110 to issue an invoice for the memory using, for example, contact list 116.

Implementations of the invention are possible in configurations other than those described herein. For example, a first alternative implementation may provide a graphical user interface for allowing a customer to generate customer-defined rules, schema, and/or messages such as service requests. The graphical user interface may be associated with client device 102 or with another device associated with, for example, a customer.

A second alternative implementation may allow message handler 310 to be bypassed when a customer uses a standardized format for generating service requests and/or other messages sent to backend system 105. Use of a standardized format by a customer may entitle the customer to certain benefits, such as a faster turnaround time for processing service requests, and/or discounts on service as compared a customer that does not use a standardized format.

A third alternative implementation may utilize a message handler 110 that includes the functionality of schema module 112, service ticket manager 114 and/or, contact list 116. Implementing additional functionality in message handler 110 may reduce the overall number of devices in backend system 105. Message handler 110 may also be able to process service requests and/or issue service request replies faster when additional functionality is added to message handler 110.

A fourth alternative implementation may utilize a client device 102 operating on one or more external networks with other users and/or devices. For example, client device 102 may be associated with a home improvement store. Client device 102 may operate on an external network, such as public network 104, that is operatively coupled to a first company that manufactures garden tools, a second company that manufactures construction materials, and a third company that specializes in transporting goods to the home improvement store. Client device 102, the first company, the second company and the third company may operate in a trading network. Participants in the trading network may exchange information, such as business information, as part of a business relationship and may subscribe as a group, and/or individually, to case management services provided by backend system 105. Examples of case management services may include software and/or hardware configuration management and technical support, provisioning of new services, data archiving and restoration services, accounting and payroll services, etc.

Conclusion

Systems and methods, consistent with the principles of the invention, allow for real-time automated processing of requests, such as service requests submitted to a case management system.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with respect to FIG. 6 the order of the acts may be varied in other implementations consistent with the present invention. Moreover, non-dependent acts may be implemented in parallel. In addition, alternative implementations are possible in view of the teachings herein.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed is:

1. A system comprising:
    a schema module to:
        provide a first message handling rule based on a first schema,
            the first schema being defined by a client device,
            the first message handling rule facilitating translation of a service request from the client device,
                the service request including incoming information,
                    the incoming information including a plurality of tasks,
            the first schema including:
                a base information section for storing at least one of:
                    information associated with a sender of the service request,
                    information associated with a receiver of the service request, or
                    information identifying the first schema,
                an account information section for storing at least one of:
                    identifier information associated with the client device, or
                    identifier information associated with a user of the client device,
                an asset information section for storing:
                    data about hardware associated with the service request, or
                    data about software associated with the service request, and
                an activity information section for storing information identifying activities associated with the service request, and
        provide a second message handling rule based on a second schema,
            the second schema being defined by the system,
            the second message handling rule facilitating making a backend message available to a plurality of backend devices; and
    a message handler including a processor to:
        receive the service request,
        obtain the first schema from the schema module,
        translate the service request using the first message handling rule,
        extract the incoming information,
        publish the incoming information using the second message handling rule, and
        send, to particular backend devices of the plurality of backend devices, only particular tasks, of the plurality of tasks, of the incoming information that are relevant to the particular backend devices.

2. The system of claim 1, where the service request comprises:
    an externally generated service request associated with the sender.

3. The system of claim 1, where the processor is further to:
    receive a message from the particular backend devices when the particular tasks have been processed, and
    notify the sender that the service request has been processed.

4. The system of claim 1, where the first message handling rule uses a first extensible markup language (XML) compliant document type definition (DTD) and the second message handling rule uses a second XML compliant DTD.

5. The system of claim 4, where the first XML compliant DTD and the second XML compliant DTD are substantially the same.

6. The system of claim 1, where the processor is further to:
    validate the service request using the first message handling rule prior to publishing the service request.

7. The system of claim 1, where the service request is received from a client device via a persistent connection.

8. The system of claim 1, where the plurality of backend devices are part of a backend system including an application server.

9. The system of claim 1, where the backend message is made available to the plurality of backend devices via a software agent operating in association with the plurality of backend devices.

10. A method comprising:
    receiving a service request based on a condition of a client device,
        the service request being generated using a schema,
            the schema including:
                a base information section for storing at least one of:
                    information associated with a sender of the service request,
                    information associated with a receiver of the service request, or
                    information identifying the schema,
                an account information section for storing at least one of:
                    identifier information associated with the client device, or
                    identifier information associated with a user of the client device,
                an asset information section for storing:
                    data about hardware associated with the service request, or
                    data about software associated with the service request, and
                an activity information section for storing information identifying activities associated with the service request;
    translating the service request using a client-defined rule to produce a translated message compatible with a backend system;
    extracting information from the translated message to produce extracted information,
        the extracted information including a plurality of tasks; and providing, to particular backend devices of the backend system, only particular tasks, of the plurality of tasks, of the extracted information that are relevant to the particular backend devices using a rule defined by the backend system.

11. The method of claim 10, further comprising:
receiving a response from the backend system when the backend system has performed an action based on operating on the extracted information; and
using information in the response to produce a reply message,
the reply message informing a destination about the action.

12. The method of claim 11, where the destination comprises at least one of the client device, a third party, a help desk, a service ticket manager, a customer, or an application server.

13. The method of claim 11, where the destination operates on an external network with a third party device to facilitate a business transaction.

14. The method of claim 10, where the translating further comprises:
operating on the service request using the client-defined rule;
extracting client information from the service request using the client-defined rule;
transforming the client information into approved client information using the rule; and
including the approved client information in the translated message.

15. The method of claim 10, where the condition comprises at least one of a hardware problem, a software problem, an upgrade request, a maintenance request, a new service request, an account inquiry, a help desk inquiry, a status inquiry, or a request for information.

16. The method of claim 10, where the client-defined rule is extensible markup language (XML) compatible.

17. The method of claim 10, further comprising:
validating the service request prior to the translating.

18. The method of claim 17, where the validating includes at least one of determining whether the client device is authorized to send the service request, determining whether information included in the service request is valid, determining whether a format of the service request is valid, determining whether the client device is associated with a valid account, determining if a message structure is valid, or determining whether the backend system is authorized to receive the particular tasks.

19. A message handler comprising:
a network interface to:
accept a service request,
the service request including client information and client data received from a sender,
the client information including a plurality of tasks, and forward a backend message;
a validator to:
validate the service request to determine whether the sender is authorized, and
determine whether the client information and the client data are valid;
a translator to:
translate the service request using a first schema that is defined by a client,
the first schema including:
a base information section for storing at least one of:
information associated with the sender,
information associated with a receiver of the service request, or
information identifying the first schema,
an account information section for storing:
identifier information associated with the client, or
identifier information associated with a contact associated with the client,
an asset information section for storing:
data about hardware associated with the service request, or
data about software associated with the service request, and
an activity information section for storing information identifying activities associated with the service request; and
parse the service request, using the first schema, to extract the client information and the client data; and
a publisher to:
provide the backend message to the network interface in a format defined by a backend schema, the backend message including valid client information and valid client data,
send the backend message to a database accessible to a backend system associated with operating on the valid client data, the backend system including a plurality of backend devices, and
send a notification only to particular backend devices, of the plurality of backend devices, informing the particular backend devices that the backend message has been sent to the database, the plurality of tasks being relevant to the particular backend devices.

20. The message handler of claim 19, where the first schema is operatively associated with a schema database.

21. The message handler of claim 19, where the translator includes a first translator portion residing on the message handler and a second translator portion residing on a backend device, of the plurality of backend devices.

22. The message handler of claim 21, where the second translator portion is implemented as an agent operatively coupled to the backend system.

23. The message handler of claim 19, where the translator is further to:
translate a reply message into a format compatible with the sender.

24. The message handler of claim 19, where the sender includes a client device associated with a user that has a business relationship with a backend device operating on a backend network.

25. The message handler of claim 19, where the service request complies with a markup language syntax.

26. A non-transitory computer-readable medium including one or more instructions for execution by one or more processors, the one or more instructions comprising:
one or more instructions that, when executed by the one or more processors, cause the one or more processors to:
receive a service request via a network interface;
access a first schema associated with an incoming format associated with the service request,
the incoming format being defined by a client device,
the first schema including:
a base information section for storing at least one of:
information associated with a sender of the service request,
information associated with a receiver of the service request, or
information identifying the first schema, an account information section for storing:
  identifier information associated with the client device, or
  identifier information associated with a contact associated with the client device,
an asset information section for storing:
  data about hardware associated with the service request, or
  data about software associated with the service request, and
an activity information section for storing information identifying activities associated with the service request;
parse the incoming format to extract information from the service request,
  the information including a plurality of tasks;
use the first schema for translating the incoming format into an outgoing format associated with a backend device,
  the using the first schema for translating including converting the information into the outgoing format;
access a second schema associated with the outgoing format; and
publish an outgoing message using the second schema,
  the outgoing message including the information in the outgoing format, the publishing making only particular tasks, of the plurality of tasks associated with the outgoing message, that are relevant to the backend device available to the backend device for processing.

27. The computer-readable medium of claim 26, where the incoming format and the outgoing format are compatible with a markup language syntax.

* * * * *